United States Patent
Inoue

(10) Patent No.: US 7,841,316 B2
(45) Date of Patent: Nov. 30, 2010

(54) CONTROLLER FOR DIRECT INJECTION ENGINE

(75) Inventor: Masaomi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 414 days.

(21) Appl. No.: 12/129,186

(22) Filed: May 29, 2008

(65) Prior Publication Data

US 2009/0018755 A1    Jan. 15, 2009

(30) Foreign Application Priority Data

Jul. 11, 2007   (JP)  ............................. 2007-181745

(51) Int. Cl.
*F02D 41/00*   (2006.01)
*F02D 43/00*   (2006.01)
(52) U.S. Cl. ..................... 123/299; 123/90.15; 701/103
(58) Field of Classification Search ................. 123/299, 123/300, 305, 478, 90.15, 90.17; 701/103–105
See application file for complete search history.

(56) References Cited

U.S. PATENT DOCUMENTS

| 6,637,386 B2 | 10/2003 | Murata et al. |
| 7,222,602 B2 | 5/2007 | Fukasawa |

FOREIGN PATENT DOCUMENTS

| JP | 2001-115866 A | * | 4/2001 |
| JP | 2004-245103 A | * | 9/2004 |
| JP | 2006-291916 A | * | 10/2006 |
| JP | 2006-342781 |  | 12/2006 |

OTHER PUBLICATIONS

Chinese Office Action dated Feb. 12, 2010, issued in corresponding Chinese Application No. 200810131502.2, with English translation.

* cited by examiner

*Primary Examiner*—Hieu T Vo
(74) *Attorney, Agent, or Firm*—Nixon & Vanderhye PC

(57) ABSTRACT

When an engine is at starting or at cold state, a closing time of an exhaust valve is set before an intake top dead center to close the exhaust valve early. An exhaust residual gas is compressed by a cylinder to raise an inner cylinder temperature. A pre-fuel injection is performed from a time of closing the exhaust valve to a time of the intake top dead center in such a manner that the pre-injected fuel is combusted to raise the inner cylinder temperature. This increase in temperature expedites an atomization of fuel injected at a main fuel injection. A wet amount of fuel is reduced and HC emission is also reduced.

11 Claims, 5 Drawing Sheets

FIG. 6

| COOLANT TEMP. Tw | -35 | - - - - - - - - - - - - - | 100 |
|---|---|---|---|
| TARGET ADVANCE AMOUNT "A" | A(-35) | - - - - - - - - - - - - - | A(100) |

FIG. 7

| COOLANT TEMP. Tw | -10 | - - - - - - - - - - - - - | 100 |
|---|---|---|---|
| PRE-FUEL INJECTION QUANTITY Qp | Qp(-10) | - - - - - - - - - - - - - | Qp(100) |

CONTROLLER FOR DIRECT INJECTION ENGINE

CROSS-REFERENCE TO RELATED APPLICATION

This application is based on Japanese Patent Application No. 2007-181745 filed on Jul. 11, 2007, the disclosure of which is incorporated herein by reference.

FIELD OF THE INVENTION

The present invention relates to a controller for a direct injection engine in which fuel is injected into a cylinder directly.

BACKGROUND OF THE INVENTION

A direct injection engine has been developed in order to improve fuel economy, reduce emission, and improve output. In such a direct injection engine, when an engine is at starting or at cold state (before warm-up), the fuel injected into the cylinder is hardly atomized and tends to adhere on an inner surface of a cylinder or a top surface of a piston. If such an adhering fuel is increased, a fuel quantity contributing to combustion is decreased so that the driving condition of the engine becomes unstable. The quantity of the adhering fuel is referred to as a wet quantity of the fuel hereinafter.

In a case where the engine is at starting or at cold state, if the fuel injection quantity is increased, the fuel contributing to the combustion is increased to obtain a stable combustion. However, if the fuel quantity is increased, the wet quantity of the fuel is also increased, which may increase HC emission especially when the warm-up of the engine has not been completed.

JP-2006-307736A (U.S. Pat. No. 7,222,602B2) shows a fuel injection system which reduces the wet quantity of the fuel. In this fuel injection system, when a deterioration of the fuel combustion is detected or estimated, the fuel injection is split into a plurality of injections to expedite the atomization of the fuel and reduce the wet quantity of the fuel.

When the engine is at starting or at cold state, an inner cylinder temperature is relatively low. Hence, even if a split injection is conducted, the injected fuel is not well atomized and the wet quantity is not reduced effectively, so that the emission is not sufficiently reduced.

SUMMARY OF THE INVENTION

The present invention is made in view of the above matters, and it is an object of the present invention to provide a controller for a direct injection engine which is capable of reducing an emission while maintaining a stable combustion when an engine is at starting and at cold state.

According to the present invention, a controller includes an exhaust valve control means for performing an exhaust valve early closing control in which a closing timing of an exhaust valve is set before an intake top dead center at least when the engine is at starting and/or at cold state. The controller further includes a fuel injection control means for performing a pre-fuel injection from a time of closing the exhaust valve to a time of the intake top dead center while the exhaust valve early closing control is performed, and performing a main fuel injection in a suction stroke and/or a compression stroke.

When the engine is at starting and/or at cold state, an exhaust valve early closing control is performed so that a closing timing of an exhaust valve is set before an intake top dead center. Thereby, the exhaust residual gas in the cylinder is compressed to raise the temperature of the gas in the cylinder while the piston slides up from a time of closing the exhaust valve to a time of the intake top dead center. This heat of compression raises the inner cylinder temperature, and raises the temperature on the cylinder inner wall and a top surface of the piston. While the exhaust valve early closing control is performed, the pre-fuel injection is conducted from a time of closing the exhaust valve to a time of the intake top dead center. The inner cylinder temperature is increased so that the atomization of fuel injected by the pre-fuel injection can be expedited. Further, the fuel injection quantity by the main fuel injection is less than a conventional fuel injection quantity by a certain amount corresponding to the pre-fuel injection quantity. This also expedites the atomization of the fuel injected by the main fuel injection. Therefore, the wet quantity of the fuel is effectively reduced and an enough quantity of fuel contributing to the combustion can be obtained by a fuel increasing correction amount which is less than conventional. While the stable combustion is achieved, the emission such as hydrocarbon is reduced.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 6 is a chart showing a map of target advance amount "A"; and

FIG. 7 is a chart showing a map of pre-fuel injection quantity Qp.

DETAILED DESCRIPTION OF EMBODIMENTS

An embodiment of the present invention will be described hereinafter.

Figure 1:
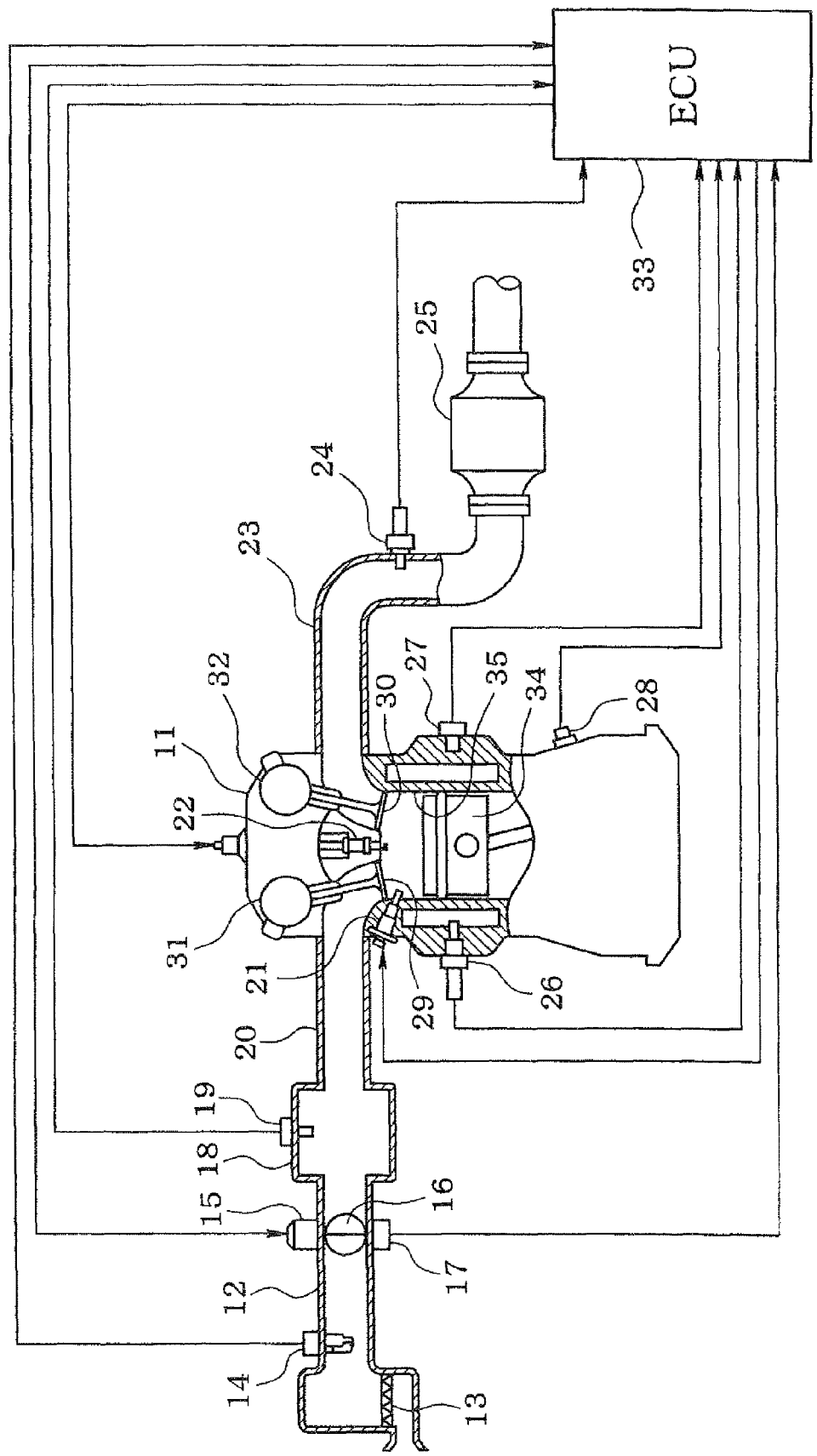
FIG. 1 is a schematic view of an engine control system according to an embodiment of the present invention.

Referring to FIG. 1, an engine control system is explained. An air cleaner 13 is arranged upstream of an intake pipe 12 of an internal combustion engine 11 which is a direct injection engine. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 is connected to the surge tank 18. A fuel injector 21 is mounted on each cylinder at a vicinity of an intake air port in order to inject fuel into the cylinder directly. A spark plug 22 is mounted on a cylinder head of the engine 11 corresponding to each cylinder to ignite air-fuel mixture in each cylinder.

The engine 11 is provided with an intake valve timing controller 31 which adjusts valve timing of the intake valve 29, and an exhaust valve timing controller 32 which adjusts valve timing of an exhaust valve 30.

An exhaust gas sensor (an air fuel ratio sensor, an oxygen sensor) 24 which detects an air-fuel ratio of the exhaust gas is respectively provided in each exhaust pipe 23, and a three-way catalyst 25 which purifies the exhaust gas is provided downstream of the exhaust gas sensor 24.

A coolant temperature sensor 26 detecting a coolant temperature, a knock sensor 27 detecting a knock vibration and a crank angle sensor 28 outputting a pulse signal every predetermined crank angle of a crankshaft of the engine 11 are disposed on a cylinder block of the engine 11. A crank angle and an engine speed are detected based on the output signal of the crank angle sensor 28.

The outputs of the sensors are inputted to an electronic control unit (ECU) 33. The ECU 33 includes a microcomputer and a Read Only Memory (ROM) to control a fuel injection quantity of the fuel injector 21 and an ignition timing of the spark plug 22.

Figure 5:
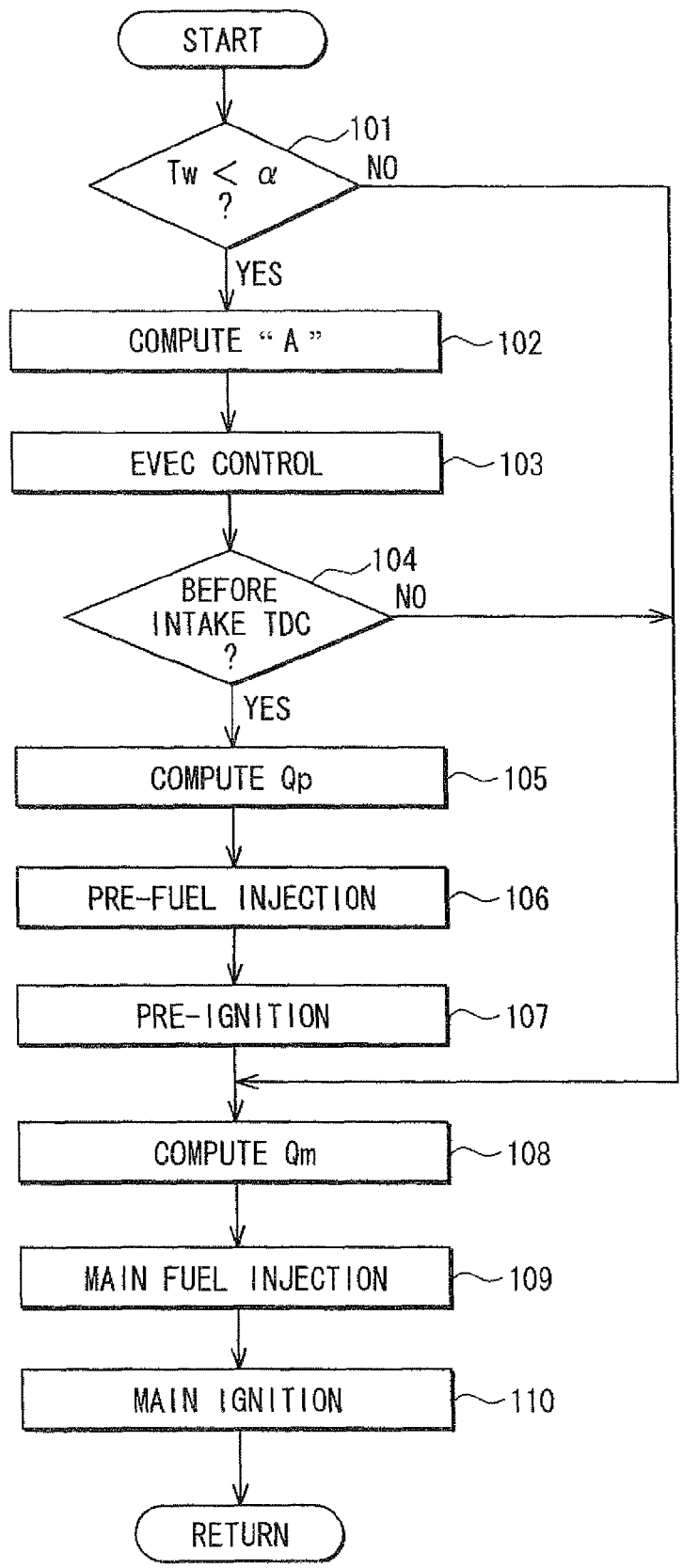
FIG. 5 is a flowchart showing a cold state control routine.

The ECU 33 executes a cold state control routine shown in FIG. 5 during a cold state of the engine 11 from a time of starting the engine 11 to a time of completing warm-up of the engine 11.

Figure 2:
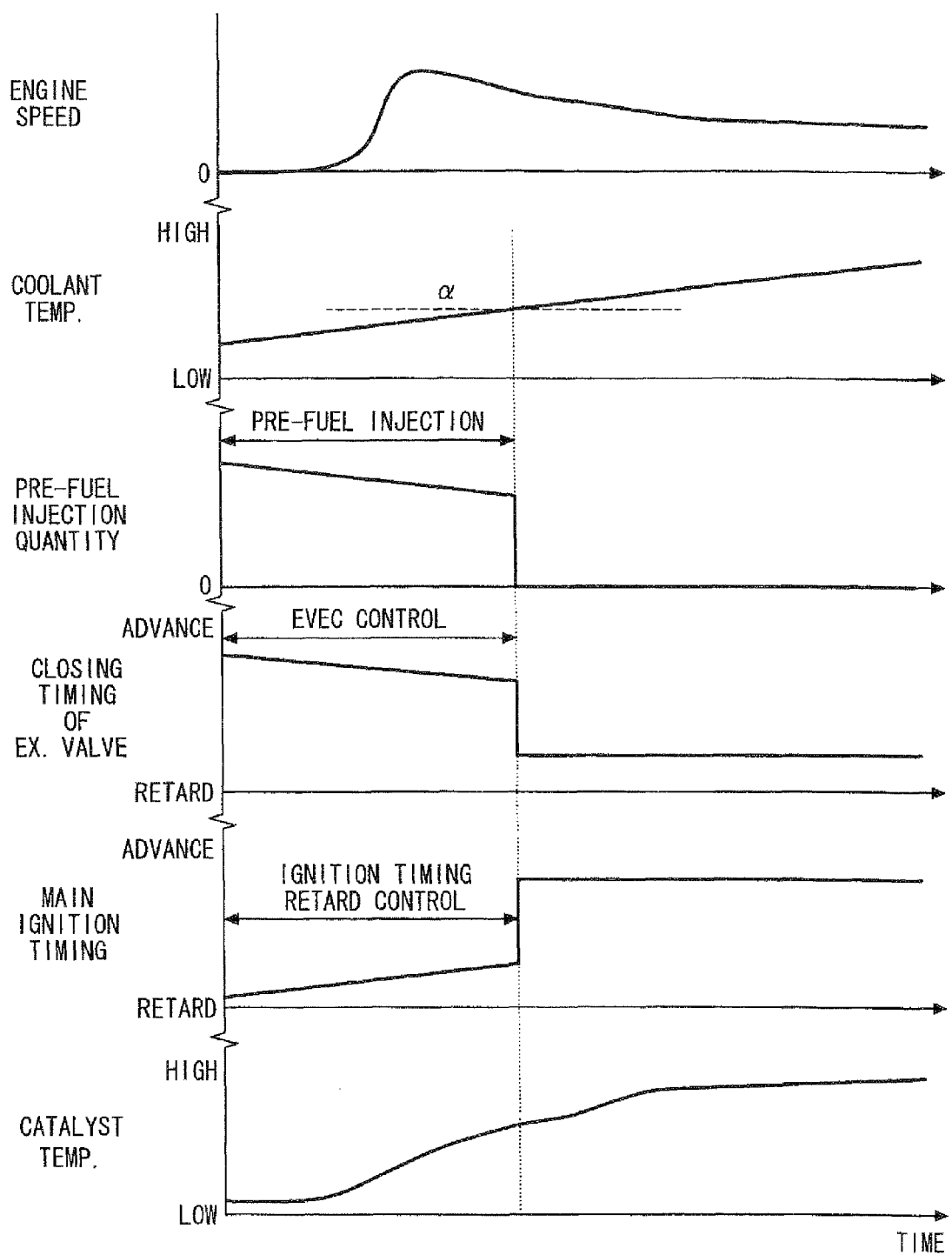
FIG. 2 is a time chart for explaining a control in a cold state.
Figure 3:
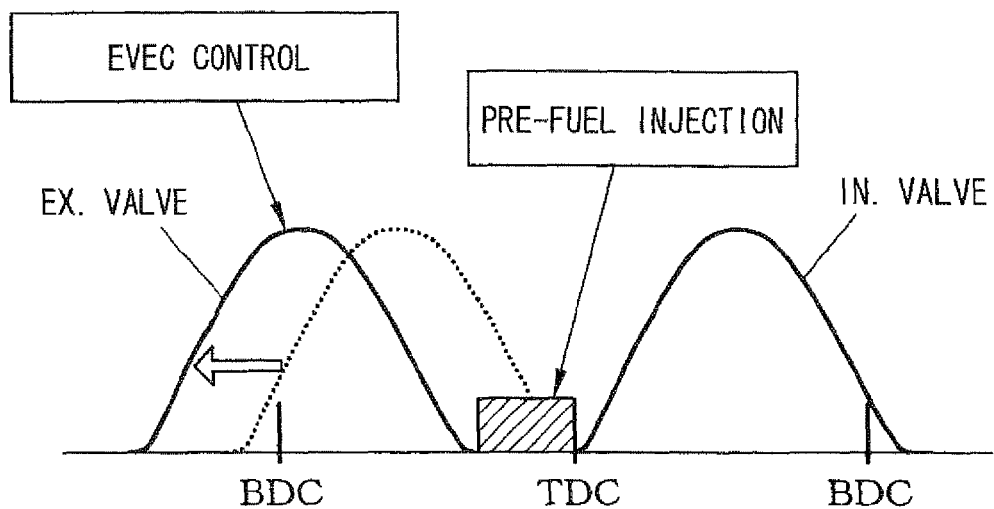
FIG. 3 is a chart for explaining an exhaust valve early closing control and a pre-fuel injection control.
Figure 4:
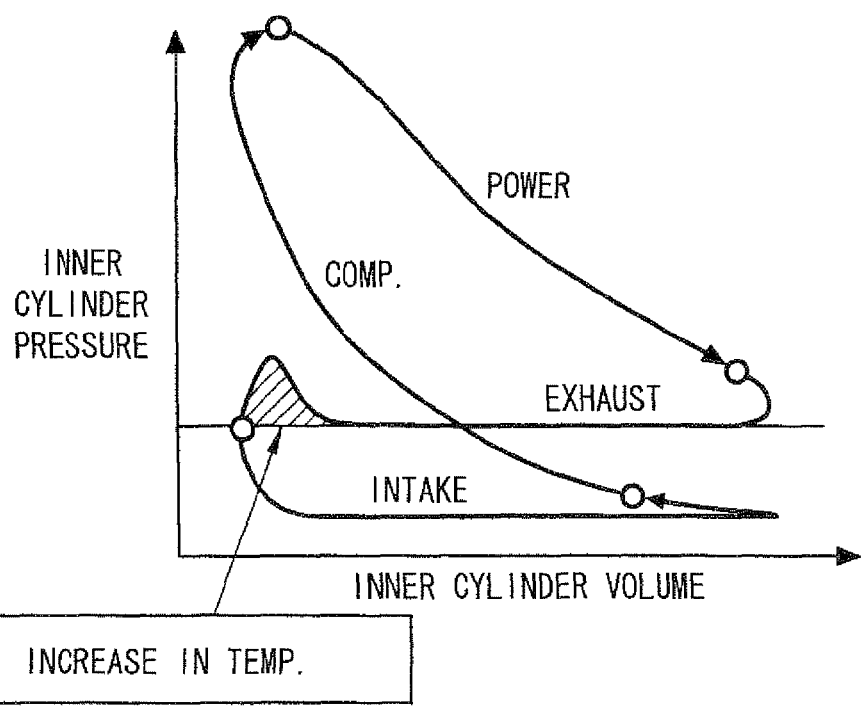
FIG. 4 is a chart for explaining a temperature rise by a cylinder gas compression.

As shown in FIG. 2, after an ignition switch (not shown) is turned on, during a cold state in which a coolant temperature Tw is less than a predetermined value α, the exhaust valve timing controller 32 advances an exhaust valve timing (opening/closing timing of the exhaust valve 30). An exhaust valve early close control is performed in order to set a closing timing of the exhaust valve 30 at a time just before the intake bottom dead center (FIG. 3). A piston 34 slides up from a time of closing the exhaust valve 30 to a time of the intake top dead center, so that an exhaust residual gas in the cylinder is compressed to raise an inner cylinder temperature (FIG. 4). Temperature of an inner surface of the cylinder 35 and an upper surface of the piston 34 are also increased. The exhaust valve early close control is referred to as EVEC control hereinafter.

While the EVEC control is performed, from the time of closing the exhaust valve 30 to the time of the intake top dead center, a pre-fuel injection is performed (FIG. 3) so that the fuel injected at the pre-fuel injection is expedited to be atomized by an increment in inner cylinder temperature. The fuel injected at the pre-fuel injection is combusted by a pre-ignition to raise temperature of the inner surface of the cylinder 35 and the top surface of the piston. The increase in inner cylinder temperature by the EVEC control and the combustion of the pre-injected fuel expedites an atomization of the fuel at the main fuel injection and the pre-fuel injection. The wet quantity of the fuel is reduced and a stable combustion is assured while the engine is at starting or at cold state.

While the EVEC control and the pre-fuel injection are performed, an ignition timing retard control is performed to retard the ignition timing of main ignition in the main fuel injection relative to an ordinal ignition timing after the warm-up of the engine. Thereby, the increase in inner cylinder temperature expedites an atomization of the fuel injected at the main fuel injection while the stable combustion is assured. By retarding the ignition timing of the main ignition, the exhaust temperature is increased to expedite a warm-up of the catalyst 25.

Referring to FIG. 5, a cold state control routine will be described hereinafter.

The cold state control routine is executed at specified intervals while the ECU 33 is ON (for example, after the ignition switch is turned on). In step 101, the computer determines whether a coolant temperature Tw detected by the sensor 26 is lower than a predetermined value α (for example, 60° C.). That is, the computer determines whether the engine 11 is at cold state.

When the answer is Yes in step 101, the procedure proceeds to step S102 in which a target advance amount "A" in accordance with a current coolant temperature Tw is computed based on a map shown in FIG. 6.

When a closing timing of the exhaust valve 30 is changed according to the EVEC control, a compression amount of the gas in the cylinder from a time of closing the exhaust valve 30 to a time of the intake top dead center is changed so that the increment in inner cylinder temperature is changed. According to the map shown in FIG. 6, as the coolant temperature Tw decreases, the target advance amount "A" increases to advance the closing time of the exhaust valve 30. As the engine temperature decreases, the inner cylinder temperature decreases. In such a case, the closing timing of the exhaust valve 30 is advanced to increase an increasing rate of the inner cylinder temperature.

The target advance amount "A" can be computed based on information indicative of engine temperature other than the coolant temperature Tw. Alternatively, the target advance amount "A" can be computed based on an intake air temperature.

Then, the procedure proceeds to step S103 in which the exhaust valve timing controller 32 advances the exhaust valve timing from an intermediate position by the target advance amount "A". The intermediate position is, for example, a position in which the closing timing of the exhaust valve 30 is at the intake top dead center. Thereby, the exhaust residual gas in the cylinder is compressed to raise the inner cylinder temperature while the piston 34 slides up from a time of closing the exhaust valve 30 to a time of the intake top dead center.

Then, the procedure proceeds to step 104 in which the computer determines whether the closing timing of the exhaust valve 30 becomes right before the intake top dead center based on whether the actual advance amount of the exhaust valve reaches the target advance amount "A". The actual advance amount of the exhaust valve is detected by the crank angle sensor 28 or an exhaust cam angle sensor (not shown). When the answer is Yes in step 105, that is, when the closing timing of the exhaust valve 30 becomes right before the intake top dead center, the procedure proceeds to step 105. In step 105, the computer computes a pre-fuel injection quantity Qp in accordance with the current coolant temperature Tw, referring to map shown in FIG. 7.

Generally, as the engine temperature decreases, the wet quantity of the fuel increases. According to the map shown in FIG. 7, as the coolant temperature Tw decreases, the pre-fuel injection quantity Qp increases. Thereby, as the engine temperature decreases, the pre-fuel injection quantity is increased so that the inner cylinder temperature is increased to avoid the increment of the wet quantity.

The pre-fuel injection quantity Qp can be computed based on information indicative of the engine temperature other than the coolant temperature. Alternatively, the pre-fuel quantity Qp can be computed based on the intake air temperature.

Then, the procedure proceeds to step 106 in which a pre-fuel injection is performed. The fuel of the pre-fuel injection quantity Qp is injected into the cylinder from the time of closing the exhaust valve to the time of the intake top dead center. The inner cylinder temperature is raised to expedite the atomization of the fuel injected at the pre-fuel injection.

Then, the procedure proceeds to step 107 in which the pre-ignition is performed in order to combust the fuel injected at the pre-fuel injection, whereby the inner cylinder temperature is further raised.

Then, the procedure proceeds to step 108 in which a main fuel injection quantity Qm is computed based on the pre-fuel injection quantity Qp and an engine driving condition, such as the coolant temperature, the intake air quantity, and the engine speed. Then, the procedure proceeds to step 109 in which the main fuel injection is performed at an appropriate timing according to the current combustion mode. For example, in a case of the homogeneous combustion mode, the fuel is injected at the intake stroke, and in a case of the stratified combustion mode, the fuel is injected at the compression stroke. The fuel of main fuel injection quantity Qm is injected into the cylinder through the injector 21. The main fuel injection can be split at the intake stroke and at the compression stroke.

Then, the procedure proceeds to step 110 in which a main ignition is performed in order to combust the fuel injected at the main fuel injection. While the EVEC control and pre-fuel injection are performed, the ignition timing retard control is performed in such a manner that the main ignition timing is retarded relative to the ignition timing after the warm-up of the engine (ordinal ignition timing). The inner cylinder temperature is raised to expedite the atomization of the fuel injected at the main fuel injection so that the combustion state becomes stable. The main ignition timing is retarded to raise the exhaust gas temperature, whereby the warm-up of the catalyst 25 is expedited.

According to the present invention, when the engine is at the cold state in which the coolant temperature Tw is less than the predetermined value α, the EVEC control is performed to bring the closing time of the exhaust valve 30 before the intake top dead center. Thereby, the exhaust residual gas in the cylinder is compressed to raise the inner cylinder temperature while the piston 34 slides up from the time of closing the exhaust valve 30 to the time of the intake top dead center. Furthermore, while the EVEC control is performed, from the time of closing the exhaust valve 30 to the time of the intake top dead center, the pre-fuel injection is performed so that the pre-injected fuel is expedited to be atomized by the increased inner cylinder temperature. The pre-injected fuel is combusted by the pre-ignition to raise temperature of the inner surface of the cylinder 35 and the top surface of the piston.

The increase in inner cylinder temperature by the EVEC control and the pre-fuel injection expedites the atomization of the fuel injected at the main fuel injection after the pre-fuel injection. The wet quantity of the fuel is effectively reduced. Even while the engine is at cold state, enough amount of fuel is obtained to perform the stable combustion by a fuel increase correction which is less than conventional amount. Hence, while a stable combustion is assured at the cold state, an exhaust emission such as hydrocarbon can be reduced.

Furthermore, while the EVEC control and the pre-fuel injection are performed, an ignition timing retard control is performed to retard the ignition timing of main ignition in the main fuel injection relative to an ordinal ignition timing after the warm-up of the engine. Thereby, the increase in inner cylinder temperature expedites the atomization of the fuel injected at the main fuel injection while the stable combustion is assured. By retarding the ignition timing of the main ignition, the exhaust temperature is increased to expedite a warm-up of the catalyst 25.

According to the present embodiment, the pre-injected fuel is ignited by the pre-ignition. The pre-ignition is not always necessary. The fuel injected by the pre-fuel injection and the main fuel injection can be ignited by the main ignition only.

When the EVEC control is performed to raise the temperature of the gas in the cylinder and the closing time of the exhaust valve is brought right before the intake top dead center, the intake valve 29 is opened before the intake top dead center, so that the compressed gas in the cylinder flows out toward the intake pipe through the intake valve 29. Hence, if the opening timing of the intake valve 29 is excessively early, the cylinder gas temperature rising effect may be deteriorated.

As a countermeasure, while the EVEC control is performed, the opening timing of the intake valve 29 may be set after the intake top dead center. With this, the compressed gas in the cylinder is prevented from flowing out toward the intake pipe during the EVEC control. The deterioration of the inner cylinder temperature rising effect can be avoided.

According to the present invention, the opening timing of the intake valve 29 can be set according to the engine driving control while the EVEC control is performed. The opening timing of the intake valve 29 may be set before the intake top dead center or after the intake top dead center.

According to the above embodiment, the EVEC control is performed by advancing the exhaust valve timing. Alternatively, the EVEC control can be performed by decreasing a lift amount of the exhaust valve 30 in a case that the system is provided with a variable exhaust valve lift apparatus. Furthermore, both of the variable exhaust valve timing controller 32 and the variable exhaust valve lift apparatus can be used to perform the EVEC control.

According to the above embodiment, when the coolant temperature is less than the value α, the EVEC control and the pre-fuel injection is performed. Alternatively, the EVEC control and the pre-fuel injection may be performed only at the starting of the engine. Alternatively, the EVEC control and the pre-fuel injection can be performed at the cold state after the engine is started. The EVEC control and the pre-fuel injection can be performed when the combustion state is deteriorated other than when the engine is at starting or at cold state.

What is claimed is:

1. A controller for a direct injection engine in which a fuel is injected into a cylinder directly, the controller comprising:
   an exhaust valve control means for performing an exhaust valve early closing control in which a closing timing of an exhaust valve is set before an intake top dead center at least when the engine is at starting and/or at cold state in order to raise an inner cylinder temperature; and
   a fuel injection control means for performing a pre-fuel injection from a time of closing the exhaust valve to a time of the intake top dead center while the exhaust valve early closing control is performed, and performing a main fuel injection in a suction stroke and/or a compression stroke.

2. A controller according to claim 1, further comprising an ignition control means for performing a pre-ignition corresponding to the pre-fuel injection and performing a main ignition corresponding to the main fuel injection.

3. A controller according to claim 1, wherein the fuel injection control means varies a fuel injection quantity by the pre-fuel injection based on at least one thermal information of an engine temperature, a coolant temperature, an oil temperature, and an intake air temperature.

4. A controller according to claim 3, wherein the fuel injection control means increases the fuel injection quantity by the pre-fuel injection as the thermal information decreases.

5. A controller according to claim 1, further comprising a variable exhaust valve timing control apparatus, wherein the exhaust valve control means performs the exhaust valve early closing control by controlling the variable exhaust valve timing apparatus in such a manner that the closing timing of the exhaust valve is advanced.

6. A controller according to claim 1, further comprising
a variable exhaust valve lift apparatus, wherein
the exhaust valve control means performs the exhaust valve early closing control by controlling the variable exhaust valve lift apparatus in such a manner that a valve lift of the exhaust valve becomes smaller to reduce an opening period of the exhaust valve.

7. A controller according to claim 1, wherein
the exhaust valve control means varies the closing timing of the exhaust valve in the exhaust valve early closing control based on at least one thermal information of an engine temperature, a coolant temperature, an oil temperature, and an intake air temperature.

8. A controller according to claim 7, wherein
the exhaust valve control means advances the closing timing of the exhaust valve in the exhaust valve early closing control as the thermal information decreases.

9. A controller according to claim 1, further comprising
an intake valve control means for setting an opening timing of an intake valve at the intake top dead center during the exhaust valve early closing control.

10. A controller according to claim 1, further comprising
a main ignition control means for retarding an main ignition timing in accordance with a main fuel injection after the pre-fuel injection relative to an ignition timing after a warm-up of the engine while the exhaust valve early closing control and the pre-fuel injection are performed.

11. A controller for a direct injection engine in which a fuel is injected into a cylinder directly, the controller comprising:
an exhaust valve control means for performing an exhaust valve early closing control in which a closing timing of an exhaust valve is set before an intake top dead center at least when the engine is at starting and/or at cold state;
a fuel injection control means for performing a pre-fuel injection from a time of closing the exhaust valve to a time of the intake top dead center while the exhaust valve early closing control is performed, and performing a main fuel injection in a suction stroke and/or a compression stroke; and
an ignition control means for retarding an main ignition timing corresponding to the main fuel injection after the pre-fuel injection relative to an ignition timing after a warm-up of the engine white the exhaust valve early closing control and the pre-fuel injection are performed.

* * * * *